Patented June 9, 1953

2,641,611

UNITED STATES PATENT OFFICE 2,641,611

METHOD OF PRODUCING BERYLLIUM BASIC ACETATE

Henry C. Kawecki, Temple, Pa., assignor to The Beryllium Corporation, Reading, Pa., a corporation of Delaware No Drawing. Application September 12, 1947, Serial No. 773,737

13 Claims. (Cl. 260—541)

This invention relates to the production of beryllium basic acetate. More particularly, the invention comprises a novel method of producing beryllium basic acetate whereby a product of high purity is obtained.

The conventional method of producing beryllium basic acetate comprises reacting beryllium hydroxide with acetic acid. Water is produced in the course of this reaction and promotes hydrolysis of the beryllium basic acetate. Accordingly, this method of producing beryllium basic acetate has been characterized by a relatively impure product and poor yields.

It has also been proposed to produce beryllium basic acetate by reacting a beryllium basic salt with acetic anhydride. The starting material for such a process, the beryllium basic salt, is itself expensive and troublesome to make, and the by-products of the reaction tend to promote hydrolysis of the principal product under the reaction conditions.

I have devised a method of producing beryllium basic acetate which is capable of producing the acetate more economically and in a higher state of purity than the methods used or proposed heretofore. The method of my invention comprises reacting beryllium oxide with acetic anhydride. The reactants are such that there is little if any opportunity for hydrolysis of the beryllium basic acetate, and any tendency toward hydrolysis can be minimized by control of the reaction conditions. Upon completion of the reaction, all compounds more volatile than beryllium basic acetate may be removed by distillation from the reaction product, and the beryllium basic acetate $$[BeO.3Be(C_2H_3O_2)_2]$$

may be subsequently recovered by distillation and condensation in a finely divided crystalline form of high purity.

As noted hereinbefore, the beryllium compound used in producing beryllium basic acetate in accordance with my invention comprises beryllium oxide. Beryllium oxide of at least commercial grade purity is generally produced by high temperature calcination of beryllium hydroxide. When the beryllium oxide used in accordance with my invention is obtained by calcination of the hydroxide, whether directly from the hydroxide itself or indirectly by evaporation of an aqueous solution of a beryllium salt followed by calcination, careful attention should be given to the choice of calcination temperature used.

The temperature of calcination of beryllium hydroxide to produce beryllium oxide has a pronounced effect upon the reactivity of the resulting oxide in the process of my invention. The reactivity of the beryllium oxide increases with a decrease in the calcination temperature. For example, I have found that beryllium oxide produced by calcination of the hydroxide at temperatures above 1000° C. reacts so slowly with acetic anhydride as to be of no use in preparing beryllium basic acetate by this method. As the temperature of calcination of the hydroxide is decreased below 1000° C., the resulting oxide products show progressively increasing reactivity with acetic anhydride. I have found that beryllium oxide products obtained by calcination of beryllium hydroxide at temperatures not substantially in excess of 500° C., and preferably within the range of 250° to 500° C., exhibit such reactivity with respect to acetic anhydride as to be preeminently suitable for the commercial production of beryllium basic acetate in accordance with the invention. A calcination temperature of approximately 350° C. produces a beryllium oxide product of particularly good characteristics for use in the process of my invention.

At any calcination temperature within the foregoing preferred range, the amount of water of combination remaining in the calcined product will vary inversely with the length of the calcination period. I have found that up to approximately 15% by weight of water of combination, expressed as $H_2O$, remaining in the calcined product has little effect upon the reactivity of the oxide with acetic anhydride. For example, a beryllium oxide product containing 8% by weight of water of combination and obtained by calcining beryllium hydroxide at a temperature of 350° C. for 12 hours has substantially the same degree of reactivity with acetic anhydride as a beryllium oxide product substantially free from water of combination and obtained by heating the same beryllium hydroxide at a temperature of 350° C. for 48 hours. However, I prefer to limit the amount of water of combination, expressed as $H_2O$, to 3–10% by weight of the calcined product in order to prevent an excessive loss of acetic anhydride by hydrolysis.

The amount of acetic anhydride used should provide a small excess over the amount stoichiometrically required to react completely with the beryllium oxide to produce beryllium basic acetate $[BeO.3Be(C_2H_3O_2)_2]$. A 5% excess of acetic anhydride is generally sufficient, although more may be used if desired. However, in determining the amount of acetic anhydride available for reaction with the beryllium oxide, due account must be made for the amount of acetic anhydride lost by hydrolysis. Acetic anhydride is hydrolyzed by the water of combination remaining in the beryllium oxide product to produce acetic acid. The reaction conditions are such, however, that this by-product is removed from the reaction zone as rapidly as it is formed. Thus, such hydrolysis affects only the amount of acetic anhydride available for reaction with the beryllium oxide and does not interfere with or impair the production of the beryllium basic acetate.

The reaction between beryllium oxide and acetic anhydride is exothermic but requires heat for its initiation. Thus, upon heating the reactants to a temperature of at least 70° C., and preferably with agitation, the reaction takes place and proceeds with sufficient vigor to eliminate the need for additional externally applied heat. The size of the beryllium oxide particles also has some effect upon the temperature of initiation of the reaction, with the result that this temperature ranges between 70° and 90° C. The heat required to start the reaction may be applied externally by an open flame or by an electrical heating element, or it may be applied internally by the passage of steam or other heated medium through pipes in contact with the reaction mixture.

A satisfactory rate of reaction and exothermicity is obtained when the beryllium oxide product is added in the granular or pebbly form in which it is normally produced by calcination in a rotary kiln. The nature of the calcination procedure, including the period of calcination, will to some extent determine the size of the oxide granules or pellets, and the particles so produced will as a rule have a satisfactory range of reactivity. These granules generally range from one-quarter to one inch in diameter. If the beryllium oxide product is more finely divided, the rate of reaction is accelerated and may become excessive. Accordingly, I have found it undesirable to grind or otherwise comminute the beryllium oxide product resulting from calcination of the hydroxide.

The reaction is preferably carried out at substantially atmospheric pressure in a closed reaction vessel communicating with a reflux condenser open to the atmosphere. The heat of reaction between the beryllium oxide and acetic anhydride is sufficient to raise the temperature of the reaction mass above the boiling temperature (137° C.) of acetic anhydride. The reflux condenser effects return of the evaporated acetic anhydride, and refluxing is continued until the reaction has run to completion. Acetic acid, which is produced by hydrolysis as explained hereinbefore, boils at a relatively low temperature and is not returned to the reaction vessel by the reflux condenser. Accordingly, the acetic acid is removed from the reaction zone as fast as it is produced and before it has an opportunity to react with any beryllium hydroxide present in the oxide product. The formation of free water by reaction between acetic acid and beryllium hydroxide is thus avoided. The conditions existing in the reaction zone are therefore such as to substantially preclude hydrolysis of the beryllium basic acetate and thereby contribute to the production of a product of high purity.

Recovery of the beryllium basic acetate in substantially pure condition is readily accomplished. Upon completion of the reaction, as indicated by the decline in temperature of the reaction mass, excess acetic anhydride is removed by raising the temperature of the reaction mass to 140°–150° C. Acetic anhydride is more volatile than beryllium basic acetate and is readily removed in this manner. The acetic anhydride so distilled from the reaction mass may be condensed for re-use. After removal of the acetic anhydride, the temperature in the reaction vessel is further raised to about 330°–350° C. to volatilize the beryllium basic acetate. Care should be taken to avoid localized or general overheating above approximately 400° C. to avoid decomposition of the beryllium basic acetate. The vapors of beryllium basic acetate are advantageously condensed in the presence of atmospheric air in a suitable air-cooled condenser. The vapors so condensed form fine crystals of beryllium basic acetate substantially uncontaminated by reactants or reaction by-products. Any unreacted beryllium oxide or other solid material remains as a residue in the reaction vessel after distillation of the beryllium basic acetate therefrom. The beryllium basic acetate product is not appreciably contaminated by the by-products of any other elements present as an impurity in the beryllium hydroxide. Accordingly, the process of my invention is characterized by the production of substantially pure beryllium basic acetate even from a relatively impure beryllium hydroxide starting material.

The following specific example is representative of the process of the invention, although it must be understood that the invention is not limited to these specific conditions. A beryllium oxide product analyzing 92% beryllium oxide (BeO) by weight and the balance water of combination was obtained by calcining beryllium hydroxide at 350° C. for 12 hours. A mixture of 49.2 pounds of this beryllium oxide product and 180 pounds of acetic anhydride was heated in a reaction vessel while being agitated by a stirring device. The reaction vessel was heated by a gas-fired furnace surrounding the bottom and sides of the vessel. The top of the vessel was provided with an air-cooled reflux condenser stack open to the atmosphere below a suction hood. When the temperature of the reaction mass reached about 75° C. the reaction began to take place with the evolution of heat. This exothermic heat of reaction was sufficient to volatilize a considerable amount of acetic anhydride which was condensed in the reflux stack and flowed back into the reaction vessel. Within about one-half hour after initiation of the reaction the temperature of the reaction mass had dropped to below the distillation temperature of acetic anhydride. Heat was again applied to the reaction vessel and the temperature of the reaction mass was maintained at 140–145° C. for a period of about 5 hours to remove excess acetic anhydride. At the end of this period the temperature within the reaction vessel was further raised to about 330° C. and the beryllium basic acetate vapors so produced were condensed in an air-cooled condensing chamber maintained at atmospheric pressure by the access of atmospheric air. The vapors condensed in the form of a fine powder composed of crystalline particles of beryllium basic acetate $$[BeO \cdot 3Be(C_2H_3O_2)_2]$$

of high purity. The operating cycle, including cleaning and charging time, required about 12 hours.

I claim:

1. The method of producing beryllium basic acetate which comprises heating to a temperature of 70–90° C. a mixture of beryllium oxide and a stoichiometric excess of acetic anhydride whereby exothermic reaction therebetween is initiated, permitting the mixture to react, and recovering the beryllium basic acetate so produced.

2. The method of producing beryllium basic acetate which comprises heating to a temperature of 70–90° C. a mixture of stoichiometric excess of acetic anhydride and a beryllium oxide product obtained by calcining beryllium hydroxide at a temperature not substantially in excess of 500° C. whereby exothermic reaction between the acetic anhydride and the beryllium oxide is initiated, and permitting the mixture to react with the resulting production of beryllium basic acetate.

3. The method of producing beryllium basic acetate which comprises heating to a temperature of 70–90° C. a mixture of a stoichiometric excess of acetic anhydride and a beryllium oxide product obtained by calcining beryllium hydroxide at a temperature within the range of 250° to 500° C. whereby exothermic reaction between the acetic anhydride and the beryllium oxide in initiated, and permitting the mixture to react with the resulting production of beryllium basic acetate.

4. The method of producing beryllium basic acetate which comprises heating to a temperature of 70–90° C. a mixture of beryllium oxide and a stoichiometric excess of acetic anhydride in the presence of a minor amount of beryllium hydroxide whereby exotherimc reaction between the beryllium oxide and the exothermic anhydride is initiated, permitting the mixture to react, and recovering the beryllium basic acetate so produced.

5. The method of producing beryllium basic acetate from beryllium hydroxide which comprises calcining the beryllium hydroxide at a temperature not substantially in excess of 500° C., heating a mixture of the calcined product with a stoichiometric excess of acetic anhydride to a temperature of 70–90° C. whereby exothermic reaction therebetween is initiated, and permitting the mixture to react to produce beryllium basic acetate.

6. The method of producing beryllium basic acetate from beryllium hydroxide which comprises calcining the beryllium hydroxide at a temperature not substantially in excess of 500° C., heating a mixture of the calcined product and a stoichimetric excess of acetic anhydride to a temperature of 70–90° C. whereby exothermic reaction therebetween is initiated, permitting the mixture to react, heating the reacted mass to a temperature sufficient to remove all compounds more volatile than beryllium basic acetate, subsequently heating the resulting residue to volatilize the beryllium basic acetate, and condensing the volatilized beryllium basic acetate.

7. The method according to claim 6 in which the volatilized beryllium basic acetate is condensed in the presence of atmospheric air with resulting formation of finely divided particles of beryllium basic acetate in crystalline form.

8. The method of producing beryllium basic acetate of high purity from relatively impure beryllium hydroxide which comprises calcining the beryllium hydroxide at a temperature not substantially in excess of 500° C., heating a mixture of the calcined product and a stoichimetric excess of acetic anhydride to a temperature of 70–90° C. whereby exothermic reaction therebetween is initiated, permitting the mixture to react, heating the reacted mass to a temperature sufficient to remove all compounds more volatile than beryllium basic acetate, subsequently heating the resulting residue to volatilize the beryllium basic acetate, and condensing the volatilized beryllium basic acetate.

9. The method of producing beryllium basic acetate which comprises heating a mixture of beryllium oxide and a stoichiometric excess of acetic anhydride to a temperature of 70–90° C. whereby exothermic reaction therebetween is initiated, permitting the mixture to react, heating the reacted mass to a temperature sufficient to remove all compounds more volatile than beryllium basic acetate, subsequently heating the resulting residue to a temperature sufficient to volatilize the beryllium basic acetate, and condensing the volatilized beryllium basic acetate.

10. The method according to claim 9 in which the volatilized beryllium basic acetate is condensed in the presence of atmospheric air with resulting formation of finely divided particles of beryllium basic acetate in crystalline form.

11. The method according to claim 1 in which the beryllium oxide comprises the product resulting from calcination of beryllium hydroxide and contains not more than 15% by weight of water of combination.

12. The method according to claim 1 in which the beryllium oxide comprises the product resulting from calcination of beryllium hydroxide and contains not more than 8–10% by weight of water of combination.

13. The method of producing beryllium basic acetate from beryllium hydroxide which comprises calcining the beryllium hydroxide under conditions such as to produce a beryllium oxide product containing not more than 15% by weight of water of combination, heating a mixture of the calcined product and a stoichiometric excess of acetic anhydride to a temperature of 70–90° C. whereby exothermic reaction therebetween is initiated, permitting the mixture to react, heating the reacted mass to a temperature sufficient to remove all compounds more volatile than beryllium basic acetate, subsequently heating the resulting residue to volatilize the beryllium basic acetate, and condensing the volatilized beryllium basic acetate.

HENRY C. KAWECKI.

References Cited in the file of this patent

Mellor, Comprehensive Treatise on Inorganic and Theoretical Chemistry, vol. 4, p. 215 (1929). Published by Longmans, Green and Co., London. (Copy in Division 59.)

Field, Journ. Am. Chem. Soc., vol. 61, pages 1817–1820 (1939).

Quinet, Compte Rendu, vol. 218, pp. 675–7, 757–9 (1944). (Copies in Patent Office Scientific Library.)